INVENTORS
WILLIAM J. MIDDLETON JR.
BURTON J. ASKOWITH

BY Michael A. Silio, Jr.
ATTORNEY

3,453,037
APPARATUS FOR MAKING NOVEL MASTER DRAWINGS USING POLARIZED LIGHT
William J. Middleton, Jr., and Burton J. Askowith, Orlando, Fla., assignors to Martin-Marietta Corporation, Middle River, Md., a corporation of Maryland
Filed Dec. 1, 1964, Ser. No. 415,053
Int. Cl. G02f 1/24; G02b 5/30, 27/28
U.S. Cl. 350—157     6 Claims

ABSTRACT OF THE DISCLOSURE

The invention relates to a method of producing microminiature electronic printed circuits wherein a single master stencil has a plurality of circuits impressed thereon. The method covered by the instant invention utilizes circular-polarized light, i.e., with no axial direction, but only left-polarized or right-polarized differentiation, to separate the majority of the master drawing images, with two of the six separations being performed by plane polarization. The use of a single master stencil eliminates all the known problems such as alignment, registration, accuracy, etc. which are present when a multiple stencil system is used.

---

This invention relates to novel master drawings of the type used in the preparation of photographic transparencies employed in the fabrication of microminiature metal masks or stencils, as well as to the novel method of making master drawings and photographic negatives such as may be used in printed circuitry. More particularly, the present concept teaches a greatly improved master drawing technique which enables a master drawing to be prepared by displaying various components of a desired configuration by respective pre-established patterns of birefringent tapes having various optical path thicknesses so that by optical procedures, a given master drawing may be utilized to prepare a plurality of photographic negatives or positives, either of which can be subsequently used for fabricating microminiature substrates, thus advantageously circumventing the usual ordeal of preparing a plurality of master drawings and subsequently having to bring about registration thereof.

Heretofore, it has been common to fabricate multilayer thin film substrates by using microminiature metal masks or stencils. These masks or stencils are used to control and describe the deposition of conductive and resistive materials on the thin film substrate. The preparation of the master drawing used in the development of the metal masks or stencils is an arduous, tedious, and expensive task, for each generic or similar type component in a composite configuration must be delineated on separate master drawings.

By way of example, in the case of electronic circuit configurations, at least three or four master drawings have in the past been required to define the conductors of a relatively simple circuit while still more master drawings are necessary in the case of a more complicated circuit. Since microminiaturization of electronic circuit configurations is both desired and necessary in present day circuit package requirements, more economical, simpler, and more accurate methods for manufacturing microminiature electronic circuits have been a constant objective of those skilled in the art of microminiaturization. However, serious inherent difficulties are encountered in the fabrication of microminiature thin film substrates by present known methods. The most troublesome of these difficulties is the slight shifting during substrate fabrication of the deposited materials from their true position on the thin film substrate. This frequently results in undesirable opening or shorting of circuit conductors and out of tolerance values of circuit components. Therefore, extreme accuracy must be maintained during the deposition step in the fabrication of thin film substrates.

In order to maintain the required high degree of material deposition accuracy, close tolerance registration of the microminiature metal masks or stencils during deposition has been mandatory. There are several known methods of obtaining acceptable close tolerance registration of the masks. For purposes of this invention a detailed description of such methods is not deemed necessary. However, it is to be understood that any well known method of providing close tolerance registration may be used in the practice of this invention.

It is common knowledge among skilled artisans in the thin film substrate art to fabricate metal masks or stencils by using photographically reduced film negative techniques together with well-known chemical etching processes much in the same manner as is used in the fabrication of printed circuits. The high degree of accuracy required during the chemical etching step is directly proportional to the accuracy of the master drawing from which the reduced photographic negative is made. This is so since photographic reduction can be accurately controlled by present known techniques. Thus, the accuracy of the metal mask, which is made from the photographically reduced negative, directly depends upon the accurate fabrication of the master drawings.

In prior known master drawing fabrication techniques, a series of several master drawings are used and each master drawing in the series must be accurately aligned with the other master drawings during the photographic reduction step. It is common practice, therefore, to use identically positioned registration marks on each master drawing of the series for alignment purposes. However, any inaccuracy of registration mark locations introduced into the master drawing complicates greatly the task of subsequently aligning the negatives during the fabrication of the metal masks.

Although the prior art methods of metal mask fabrication can produce a reasonably accurate registration, the excessive number of required master drawings necessary to achieve satisfactory results are time consuming, tedious and costly.

In view of the foregoing problems, an organized research program was undertaken to solve these problems and in so doing it was discovered that fabrication of the master drawings for a six mask multilayer thin film substrate in accordance with previously known methods required approximately 240 man-hours of drafting and checking time.

In addition, the photographic processing for delineation and the chemical processing for metal deposition of this average size multilayer thin film substrate required approximately 20 additional man-hours in handling and set-up.

In accordance with the present invention the foregoing inherent and obvious high cost and excessive time disadvantages of the prior known methods of fabricating master drawings used in the manufacture of multilayer thin film substrates are uniquely overcome by employing novel birefringent separation techniques which permit the representation of two or more different type components on a single master drawing. This technique advantageously reduces labor costs to at least one-half the labor costs of previously known processes and techniques.

A birefringent material as used herein refers to a transparent, optically stressed material having two mutually perpendicular principal axes in the plane of the material, with each axis being also perpendicular to the direction of light propagation. One of the principal axes of the birefringent material is conventionally referred to as the fast axis, and has the lowest index of refraction, whereas the other principal axis is conventionally referred to as the slow axis, and has the highest index of refraction. Half-wave retardation birefringent materials have an inherent characteristic wherein when they are properly oriented with respect to the maximum polarization axis of plane-polarized light, the plane-polarized light experiences both phase-retardation and angular rotation as it transmits through the birefringent materials. The light emerging from these half-wave birefringent materials is also plane-polarized and is commonly characterized by maximum and minimum emergent polarization axes, which axes are also mutually perpendicular. However, quarter wave retardation materials have an inherent characteristic wherein when they are properly oriented with respect to the maximum polarization axis of plane-polarized light, the light waves emerging therefrom will be either circular-polarized or elliptical-polarized. The circular-polarized light will have equal emergent polarization axes, whereas the ellipitical-polarized light will have maximum and minimum polarization axes.

More specifically, one preferred embodiment of the novel master drawing of the present invention comprises a transparent or translucent base material having a specially oriented group of one type of birefringent material in tapeform disposed for representing one aspect of a desired configuration, and other specially oriented groups of other types of birefringent tapes for respectively representing other aspects of the configuration. In order to photographically distinguish one group of birefringent tapes from other groups, a pair of plane-polarizing devices is positioned on opposite sides of and in parallelism with the base material. One of the plane-polarizing devices, hereinafter called the plane-polarizer, is positioned between a light source, such as an incandescent lamp, and the base material, and is rotated so that its polarization axis is angularly displaced a preselected amount from the optic axes of one selected group of the birefringent tapes. The light is first directed so as to pass through the plane-polarizer, thus, plane-polarizing the light, and then caused to impinge upon and transmit through the base material and all of the birefringent tapes. When the plane-polarized light transmits through the birefringent tapes, it is phase-retarded and angularly rotated an amount and degree depending upon the respective type and orientation of the birefringent tapes it propagates through. The second plane-polarizing device, hereinafter referred to as the plane-analyzer, is positioned between the base material and a sheet of photosensitive material, such as panchromatic film, and is rotated so that its polarization axis is perpendicular to the maximum polarization axis of the light emerging from the selected group of birefringent tapes. All the light emerging from the base material and the non-selected group of birefringent tapes is then directed so as to impinge upon and appreciatively transmit through the plane-analyzer. However, all light emanating from the selected group of birefringent tapes is substantially blocked by the plane-analyzer and accordingly prevented from transmitting through the plane-analyzer. When the light emanating from the plane-analyzer is photographically recorded on the photosensitive material, optical distinction exists between the selected group of birefringent tapes and other groups of birefringent tapes. It will be aparent to those skilled in the photographic art that the photosensitive material will be exposed only at areas corresponding in position to areas where light significantly emanates from the plane-analyzer, thus photographically delineating the shape and position of the selected group of tapes. Accordingly, when the master drawing is photographed through successive selected angular positions of the polarization axis of the plane-polarizer, with, of course, corresponding selected angular positions of the polarization axis of the plane-analyzer, first one aspect of the desired configuration, as represented by one group of birefringent tapes, can be photographed, and subsequently other aspects of the desired configuration; as respectively represented by other groups of birefringent tapes, can be successively photographed.

Advantageously, a single master drawing in accordance with the present invention may be used for photographically preparing a plurality of negatives for subsequent use in fabricating multilayer thin film substrates for microminiaturization of component assemblies such as electronic circuits. In the case of electronic circuits, for example, the master drawing comprises a base material, and includes means for creating a circuit pattern on the base material representative of the components of an electrical circuit, such as conductors, resistors, and dielectrics. This latter means comprises a plurality of different types of birefringent tapes, with tapes of one type employed on this base material to represent one type of electrical component and tapes of other types respectively representing other types of electrical components. Thus, when the master drawing is subsequently photographed through successive angular positions of the polarization axis of the plane-polarizer with corresponding successive angular positions of the polarization axis of the plane analyzer, first one circuit subsection of a first type of birefringent tape can be photographed, and subsequently other subsections of other types of birefringent tapes can be photographed, with no substantial optical losses of the circuit image of either of the different type of birefringent tapes being sustained.

As mentioned above, birefringent separation offers an acceptable method of combining two or more masters on a single drawing. That is to say, multilayers of birefringent tapes may be used on a single sheet of transparent or translucent material for fabricating a single master drawing. The unique birefringent separation technique of the present invention is predicted upon the following:

(1) In non-birefringent transparent materials (unstrained glass, plastics, etc.) the index of refraction is the same in all directions so that light waves propagate with equal velocity through all planes of vibration.

(2) In birefringent transparent materials (i.e. natural quartz, strained glass, cellophane, etc.), the index of refraction is different in at least two of the three mutually perpendicular axes of the material so that light waves propagate with unequal velocity through the planes of the different axes, i.e., mutually perpendicular planes of vibration. One of the axes is parallel to the direction of light propagation and is called the axis of propagation; the remaining axes are perpendicular to the direction of propagation and are respectively referred to as the fast and slow axes.

(3) The index of refraction in at least one of the mutually perpendicular planes of vibration is maximum and contains the slow axis and the axis of propagation, whereas the index of refraction in one of the remaining mutually perpendicular planes of vibration is minimum and contains the fast axis and the axis of propagation.

(4) When light specially polarized with respect to the optic axes of a birefringent material impinges upon such berefringent material it experiences maximum retardation in the plane of the slow axis, and minimum retardation in the plane of the fast axis, the intersection of these two planes being the direction of propagation.

(5) When light waves, which are polarized in a plane parallel to either the fast or slow axis, impinge normally upon a birefringent material they transmit through without phase-retardation or rotation. However, when light waves which are polarized in a plane approximately 45° to both the fast and slow axes, impinge normally upon a half-wave birefringent material they are broken into the plane-polarized components respectively vibrating in the planes of the fast and slow axes. On emergence these components recombine, but the resultant emergent beam's maximum polarization axis is rotated due to the phase-retardation.

(6) When a plane-analyzer is placed to receive the plane-polarized light emanating from a half-wave birefringent material, such light will significantly transmit through the plane-polarizer only when its polarizing axis is parallel to the maximum polarization axis of the polarized light emanating from the birefringent material. Conversely, such light waves are substantially blocked when the plane-analyzer is perpendicular to the maximum polarization axis.

In order to utilize the intrinsic derivatives of the above six facts, and to apply them to the manufacture of master drawings, a system of half-wave and/or quarter-wave birefringent tapes having their fast or slow axis specially oriented with respect to each other has been evaluated, and it has been discovered that certain configurations of these birefringent tapes are adequate for the photographic reduction process further described hereinafter.

More specifically, a first group of half-wave birefringent tapes may be attached to a transparent base to represent, for example the horizontally positioned resistors of a circuit while a second group of half-wave birefringent tapes may be attached to the same transparent base to represent, for example, the vertically positioned resistors of a circuit. However, the fast or slow axis of each group of birefringent tapes is preferably 45° displaced with respect to the other, and one of the groups of birefringent tapes must have its fast or slow axis parallel to the plane of polarization of the plane-polarized light waves. The plane-polarized light waves are provided by passing light waves through a plane-polarizer having its polarization axis in a plane approximately 45° to the fast or slow axes of one of the groups of birefringent tapes. In order to optically distinguish between light waves emanating from the two groups of half-wave birefringent tapes, a plane-analyzer is positioned so as to receive all light waves emanating from the tapes, with its polarization axis oriented in parallelism with the polarization axis of the plane-polarizer. It will be apparent, therefore, that the plane-analyzer will pass only those light waves emanating from the transparent base and from the group of half-wave birefringent tapes which have their fast or slow axes parallel to the polarizing axis of the plane-analyzer. Of course, the light waves emanating from the half-wave birefringent tapes having their fast or slow axis oriented at 45° to the polarization axis of the plane-analyzer will be blocked by or prevented from passing through the plane-analyzer. Accordingly, the light waves passing through the plane-analyzer may be directed so as to impinge upon a light sensitive material, such as panchromatic film, thus developing a first negative. However, by rotating both the plane-polarizer and plane-analyzer approximately 45° from its original position, the previously blocked light waves will now pass through the plane-analyzer while the previously passed light waves are now blocked. Thus, a second light sensitive material may be positioned so as to receive the light waves now passing through the plane-analyzer, thus developing a second negative. In this respect, the first negative provides an optical record which optically distinguish the first group of half-wave birefringent tapes from the second group, while the second negative represents an optical record distinguishing the second group of half-wave birefringent tapes from the first group.

It should be noted here that other components of the electronic circuit may be represented on the transparent base by strips of colored tape or tape having geometric patterns of color formed thereon. When preparing an optical record of the different colored tapes or the geometrically color patterned tapes, the polarizer and analyzer are removed, and color filters used in their stead. A detailed description of a novel method and apparatus for optically distinquishing colored tapes and geometrically color patterned tapes is disclosed in patent application, Ser. No. 217,450, now U.S. Patent No. 3,288,607, filed Aug. 16, 1962, in the name of William J. Middleton, Jr., a coinventor of the present invention, entitled "Novel Master Drawing and Method of Making Same," which patent application is assigned to the assignee of the present invention.

In addition, other components of the electronic circuit may be optically distinguished by also using quarter wave birefringent tapes. Photographic distinction is achieved by substituting first a left and then a right circular analyzer for the plane-analyzer, and by specially orienting the polarization axis of the plane-polarizer with respect to the quater-wave birefringent tapes. That is to say, when a plane-polarizer and an analyzer are used, specially oriented groups of quarter-wave birefringent tapes may be optically distinguished from each other as well as from the groups of half-wave birefringent tapes by sequentially positioning the plane-polarizer with respect to each group of quarter-wave birefringent tapes and appropriately utilizing either the left or the right circular-analyzer, whereas, when a plane-polarizer and plane-analyzer are used, specially oriented groups of half-wave birefringent tapes may be optically distinguished from each other as well as from the groups of quarter-wave birefringent tapes by sequentially orienting the plane-polarizer and plane-analyzer with respect to each group of half-wave birefringent tapes. Accordingly, a relatively higher number of components of the circuit can be represented on a single master drawing by utilizing both the linear and circular birefringent separation technique herein disclosed in combination with the color separation technique disclosed in the above-mentioned patent. A detailed description of this combination of photographic separation techniques is set forth below with regard to the description of the preferred embodiments of the present invention as depicted in the several drawings hereof.

It should be noted here that when both linear and circular birefringent separation techniques are utilized, and it becomes necessary to connect a half-wave birefringent tape with a quarter-wave birefringent tape, a colored tape or a geometrically color patterned tape should be used as the connecting strip. This becomes necessary due to the fact that the amount of retardation and angular rotation of the polarized light at areas of overlap results in insufficient optical distinction between areas of overlap and the half-wave birefringent tapes per se. However, no serious problems exist with regard to areas of overlap of the birefringent tapes of the same optical relationship, i.e., of the same type. This is so as to overlap areas of (1) half-wave birefringent tapes, (2) quarter-wave birefringent tapes, (3) colored tapes and either type of birefringent tapes, or (4) geometrically color patterned tapes and either type of birefringent tapes. Of course, the problems encountered regarding overlap areas of colored tapes and geometrically color patterned tapes are uniquely avoided by utilizing the principles taught in the above-mentioned patent.

It is accordingly a primary object of the present invention to provide novel master drawings having groups of specially oriented, optically stressed strips of material for respectively representing groups of components of a desired configuration.

It is a further object of the present invention to provide a novel method for fabricating a plurality of microminiature negatives, which method includes the use of a novel master drawing wherein a plurality of birefringent tapes having their optic axes oriented in one direction are used to represent one group of components of a desired configuration and a plurality of birefringent tapes having their optic axes displaced from the optic axes of the first plurality of tapes are used to represent another group of components of the desired configuration.

It is a further object of the present invention to provide a novel method for producing a plurality of photographic negatives, which method includes the preparation of a novel master drawing comprising a first plurality of half-wave birefringent tapes having their optic axes oriented in one direction for representing one type of component of a selected circuit and a second plurality of half-wave birefringent tapes having their optic axes displaced 45° from the optic axes of the first plurality of birefringent tapes for representing another type of component of the selected circuit, and further includes a plane-polarizer and a plane-analyzer for photographically separating one circuit component from the other.

It is a further object of the present invention to provide a novel method for manufacturing a plurality of photographic negatives from a single master drawing wherein (1) multilayer half-wave birefringent tapes are used to represent certain components of a selected configuration, (2) multilayer quarter-wave birefringent tapes are used to represent other components of the selected configuration, (3) single layer solid colored tapes are used to represent still other components of the selected configuration, and (4) multilayer geometrically color patterned tapes are used to represent still other components of the selected configuration, whereby the various components of the selected configuration are optically distinguishable by a unique combination of linear and circular birefrigent separation, color filtration and successive photographing.

It is a further object of the present invention to provide a novel method for producing a plurality of photographic negatives, which method includes the preparation of a novel master drawing comprising first and second groups of half-wave birefringent tapes for respectively representing first and second types of components of a selected configuration with the optic axes of the first group of half-wave birefringent tapes being displaced 45° from the optic axis of the second group of half-wave birefringent tapes, whereby a specially oriented plane-polarized and plane-analyzer may be utilized for optically distinguishing the first and second type of componets from each other; and comprising first and second groups of quarter-wave birefringent tapes for respectively representing third and fourth types of components of the selected configuration, whereby a plane-polarizer and a left and right circular analyzer may be utilized for optically distinguishing the third and fourth types of components from each other, as well as from the first and second type of components.

It is a further object of the present invention to provide a novel master drawing and a novel method of photographically preparing microminiature photographic negatives which materially reduce the number of master drawings required for the preparation of multilayer thin film electronic circuits.

It is a further object of this invention to provide a novel master drawing for photographically preparing microminitature negatives or positives upon which circuit components, which have heretofore been shown on two or more master drawings, may be combined on a single master drawing, thereby decreasing the man hours required to prepare such master drawings and increase the accuracy of registration and material deposition of circuit components on the microminiaturized thin film electronic circuits made through the use of the negatives.

Figure 1:
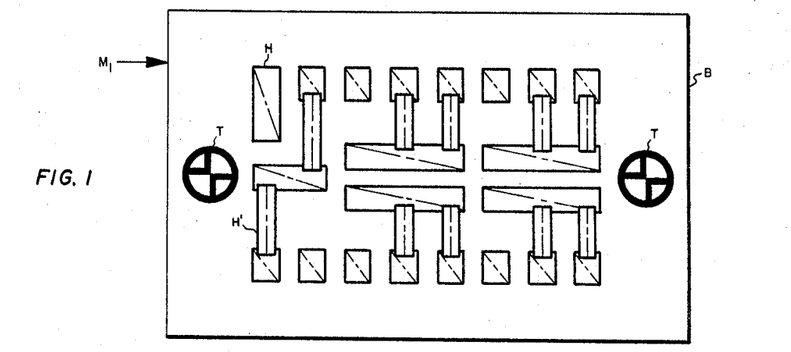
FIGURE 1 shows an exemplary master drawing wherein predetermined groups of components of a selected configuration are respectively represented by specially orineted strips of optically stressed (birefringent), half-wave retardation material.
Figure 2:
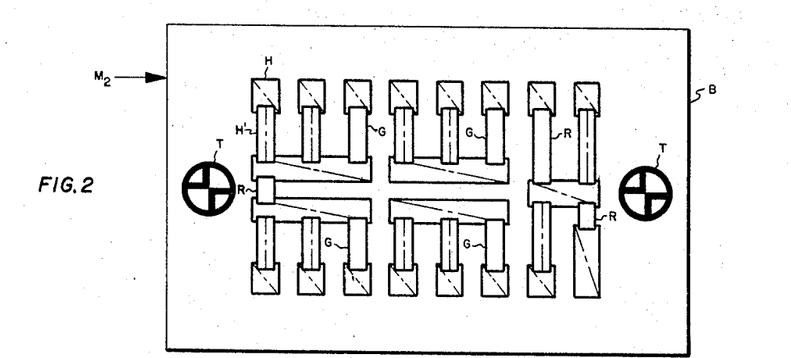
FIGURE 2 shows another examplary master drawing wherein predetermined groups of components of a selected configuration are respectively represented by specially oriented strips of optically stressed (birefringent), half-wave retardation material, and includes strips of both solid green colored and solid red colored material to respectively represent other groups of components of the configuration.
Figure 3:
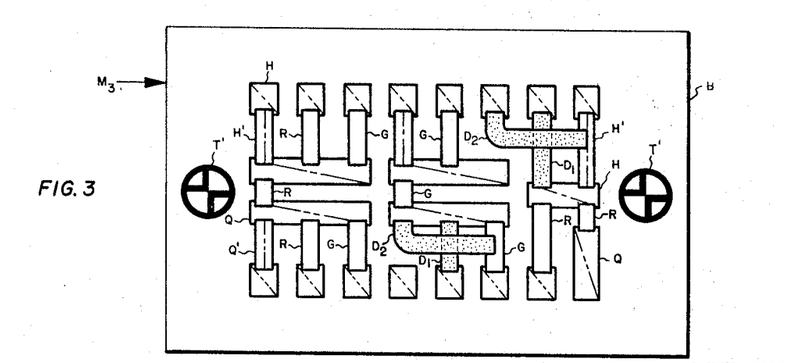
FIGURE 3 shows another exemplary master drawing wherein predetermined groups of components of a selected configuration are respectively represented by specially oriented strips of both half and quarter wave optically stressed (birefringent) material, and includes both strips of solid green and solid red colored materials, and strips of red dotted and green dotted materials to respectively represent other groups of components of the configuration.

These and further objects and advantages of the invention will become more apparent upon reference to the following description and claims and the appended drawings wherein:

*Detailed description.—FIGURES 1–3*

FIGURES 1–3 depict three exemplary master drawings, each utilizing the novel birefringent separation techniques of the present invention. FIGURES 2 and 3, however, further include the novel color separation techniques disclosed in the above-mentioned patent.

In FIGURE 1, the master drawing $M_1$ comprises a base material B having a first group of components independently delineated by strips of half-wave birefringent material H, each of which has its axis (note the slanted "dash-dot-dash" axis lines) disposed at a 45° angle with respect to the vertical, while a second group of components are independently delineated upon the base material B by strips of half-wave birefringent material H′, each of which has its axis (note the vertical "dash-dot-dash" axis lines) disposed parallel to the vertical. Thus, the axes of the strips of material or birefringent tapes H and H′ are displaced 45° apart with respect to each other. The master board $M_1$ also includes registration marks T, which basically consist of a dark circle having a modified cross positioned within the periphery of the circle. Registration marks T may be drawn on the base material B with India ink or may be cut from a sheet of black material and mounted on the base material B. In any event, the registration marks T should be fabricated so that substantially no light can pass through the marks. The base material B upon which the birefringent tapes H and H′ and the registration marks T are attached to or drawn on, may be transparent or translucent so that substantial light rays of any type will transmit through the base material B. Of course, some of the light rays striking the base material B will impinge upon the birefringent tapes H and H′ and be appropriately phase-retarded and angularly rotated. The unique utilization of the master board of FIGURE 1 in a photographic process according to the present invention is set forth in detail below respecting the description of FIGURES 5–8.

In FIGURE 2, the master drawing $M_2$ comprises a base material B having first and second groups of components independently delineated by strips of birefringent tapes H and H, which are respectively the same as the birefringent tapes H and H′ of FIGURE 1. FIGURE 2, however, also includes a third group of components independently delineated upon the base material B by strips of red colored material (R), and a fourth group of components independently delineated upon the base material B by strips of green colored material (G). The registration marks T of master drawing $M_2$ are the same as marks T of FIGURE 1, while the base material B upon which the birefringent tapes H and H', registration marks T and the red and green tapes R and G are attached to or drawn on is the same as the base material B of FIGURE 1. The unique utilization of the master board of FIGURE 2 in a photographic process according to the present invention is set forth in detail below with regard to the description of FIGURES 5–8.

In FIGURE 3, the master drawing $M_3$, comprises a base material B having first and second groups of components independently delineated by strips of birefringent tapes H and H', which are respectively the same as the birefringent tapes H and H' of FIGURE 1, and third and fourth groups of components independently delineated by strips of red colored tapes R and green colored tapes G, which are respectively the same as the red and green tapes R and G of FIGURE 1. FIGURE 3, however, also includes a fifth group of components independently delineated upon the base material B by strips of quarter-wave birefringent material Q, each of which has its axis (note the slanted "dash-dot-dash" axis lines) disposed at a 45° angle with respect to the vertical, while a sixth group of components is independently delineated upon the base material B by strips of quarter-wave birefringent material Q', each of which has its axis (note the vertical "dash-dot-dot-dash" axis lines) disposed parallel to the vertical. Thus, the axis of the birefringent tapes Q and Q' are displaced 45° apart with respect to each other. The masterboard $M_3$ of FIGURE 3 also includes a seventh group of components independently delineated upon the base material B by strips of material $D_1$ having red dots formed thereon, and an eighth group of components independently delineated upon the base material B by strips of material $D_2$ having green dots formed thereon. As thoroughly discussed in detail in the above-mentioned patent, tapes having geometric patterns of color formed thereon, such as colored dots, are advantageously capable of providing photographic distinction whenever colored tapes are positioned in overlapping relationship. Accordingly, solid colored tapes may be used so long as they do not overlap each other, whereas color dotted tapes may be used at areas of overlap. Note here that no losses in photographic distinction occur in areas where birefringent and colored tapes overlap, where half-wave birefringent tapes overlap each other, or where quarter-wave birefringent tapes overlap each other. Note also that photographic distinction will be lost at areas where half-wave and quarter-wave tapes overlap each other. However, since no photographic distinction is lost at areas where colored tapes overlap either half or quarter-wave tapes overlap, the half and quarter-wave tapes may be joined, if needed, by colored tapes, such as shown in FIGURE 3. The base material B of master drawing $M_3$ is the same as the base material of FIGURE 1. However, the registration marks T of FIGURE 3 are prepared by overlapping both half and quarter-wave tapes in the modified cross in a circle configuration shown. Since a detailed description of the need for fabricating the registration marks T as stated above is set forth in the below description of FIGURE 8, it will suffice to say here that this fabrication procedure advantageously permits the plane or circular analyzer used in the photographic process of the present invention to block light rays emanating from the registration marks T and thus optically distinguish the shape thereof on the prepared negatives. The unique utilization of the master drawing of FIGURE 3 in a photographic process according to the present invention is set forth in detail below respecting the description of FIGURES 5–8.

In order to assist in the description of the unique utilization of master drawings $M_1$, $M_2$ and $M_3$, as depicted in FIGURES 5–8, a brief description of the principles involved when plane-polarized light impinges upon a retardation plate, such as the half and quarter-wave birefringent tapes H, H', Q and Q' of FIGURES 1–3, is set forth below in conjunction with the schematic of FIGURE 4.

Figure 4:
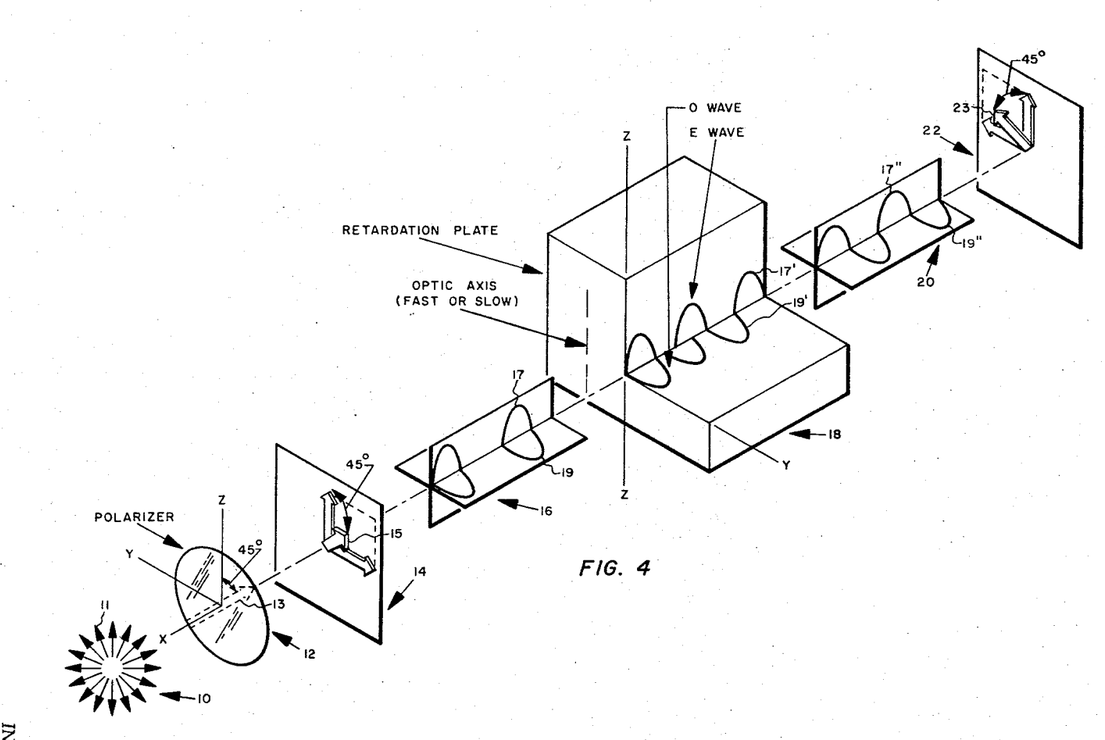
FIGURE 4 depicts a graphic representation of how a half-wave retardation plate (e.g., birefringent tape) rotates the direction of linear light (polarized) when such light impinges upon the plate at a 45° angle with respect to the optic (fast or slow) axis of the plate.

*Detailed Description.—FIGURE 4*

The schematic of FIGURE 4 graphically depicts how a half-wave retardation plate 18, such as tapes H and H' of FIGURES 1–3, phase-retards and rotates the direction of polarization of linear light by 90° when light is incident on the retardation plate at an angle of 45° with respect to the optic (fast or slow) axis of the retardation plate 18.

In FIGURE 4, a natural light source, generally indicated at 10, is positioned in front of a plane-polarizer, generally indicated at 12. Natural light as it appears here means light in which the electric E vectors 11; which always lie in the Y–Z plane if the light wave is traveling along the X axis, are arranged symetrically about the direction of propagation (X axis). As it is well known, the waves from a source of light presumably originate in the molecules of the source, but it is impossible to isolate a single molecule and study the wave train it emits. Since every light source contains a tremendous number of molecules oriented in all possible directions, a beam of light from such source, traveling, for example, along the X axis toward the right in FIGURE 4, would then be expected to consist of a mixture of waves, having E vectors, as shown by the E vectors 11 of FIGURE 4. However, a conventional plane-polarizer is capable of causing the E vector to be oriented at some angle with the Z axis, as shown conventionally in FIGURE 4 by the E vetcor 15 laying in the imaginary Y–Z plane 14. It is common in the art to refer to the light emanating from a light source, such as source 10, as unpolarized or natural light, whereas light transmitted through a plane-polarizer is commonly referred to as polarized light.

It should be noted here that the electric vector E in electromagnetic wave theory terminology is used to designate the direction of polarization in a plane-polarized wave. This E vector designates a vibrating electric field, vibrating in one plane only. An electric field may be defined here as the electric force flux per unit charge. Thus, since this electric force has both magnitude and direction, it is a vector quantity, and like all force vectors has components obeying the vector law, $X = R \cos \theta$, where X is the component force, R is the original or resultant force and $\theta$ is the angle between the forces X and R. If the angle $\theta$ is first plus 45° and then minus 45°, thus forming two components at right angles, we see that two such equal component forces must exist in respectively designated directions or planes. Therefore, the waves formed by the vibration of these component forces must also exist in the same two planes. However, at all times such component forces will demonstrate their presence physically as the resultant force R of these two component forces, except, of course, when such component forces are physically separated by optical blockade, or deviation exclusively in one of the component force planes.

The plane-polarizer 12 of FIGURE 4 is conventional and may be any well-known plane-polarizer having a polarizer having a polarization axis, such as shown by the axis 13. Basically, the plane-polarizer 12 is capable of plane polarizing natural light so that the E vector of the polarized light is as shown by vector 15 in the imaginary Y–Z plane 14. To assist in the description of FIGURE 4, the polarized light emerging from the polarizer 14 and traveling in the direction of the X axis is also graphically represented by the conventional E–O wave schematic 16, which shows the E wave in a X–Z plane and the O wave in a X–Y plane.

A schematic cut-away view of a retardation plane 18 is shown positioned so that the polarized light emanating from the polarizer 12 will impinge upon plate 18. In the example shown in the optic axis of plate 18 is parallel to the Z axis, and as is well-known in the art, the E wave 17 of the polarized light is always parallel to the optic axis whereas the O wave 19 of the polarized light is always perpendicular to the optic axis. Note here, that if the polarization axis 13 of polarizer 12 is angularly positioned so that the E vector in the light transmitted by it is parallel to the Z axis, only an E wave 17' would travel through the retardation plate 18, whereas if the polarization axis is positioned so that the E vector of the transmitted light is perpendicular to the Z axis, only an O wave 19' would travel through the retardation plate 18. However, when the polarization axis is positioned at some angle between 0° and 90° with the Z axis, both E and O waves travel through the retardation plate. Neglecting the small loss of light due to reflection, the amplitudes of the E and O waves in the retardation plate are equal in amplitudes to the vertical and horizontal components of the light transmitted by the polarizer 12. For the special case of FIGURE 4, i.e., since the polarization axis 13 of polarizer 12 is at a 45° angle to the Z axis (optic axis), and since the horizontal and vertical components of the light transmitted by the polarizer 12 are equal, the E and O waves in the retardation plate 18 will also be equal in amplitude. The effect upon the plane-polarized light incident upon the retardation plate 18 at a 45° angle is as follows:

As stated above, in nonbirefringement materials, i.e., unstrained glass, plastics, etc., the index of refraction in all directions is the same and hence the propagation of light waves is equally fast in all planes of vibration. This is so because $V_N = C/N$, when $V_N$ is the velocity of light in the material, N is the index of refraction, and C is the velocity of light in a vacuum. However, in birefringent transparent materials, i.e., quartz, strained glass, cellophane, etc., the index of refraction is slightly different in the planes containing the two mutually perpendicular principal axes of the birefringent material, with each plane being also perpendicular to the direction of light propagation. As stated above, one of the principal axes of the birefringent material is the fast axis, and has the lowest index of refraction, whereas the other principal axis is the slow axis, and has the highest index of refraction. Thus, when plane-polarized light impinges upon the half-wave retardation plate 18 at an angle of 45° to the Z axis, i.e., the optic axis of the birefringent plate 18, such light acts precisely as if it were separated into two plane-polarized component waves (E and O waves), with each wave respectively vibrating in the plane of the fast and slow axes. The vector sum (E vector) of the E and O waves 17 and 19 has a direction parallel to the direction of polarization of the incident plane-polarized wave. When the two equal E and O waves 17' and 19' experience respective phase-retardation as they transmit through the retardation plate 18, their vector addition (note E vector 23 in the imaginary Y–Z plane 22) at the instant they emerge from the plate 18 will again result in a plane-polarized wave equal in amplitude to the incident plane-polarized wave but vibrating now in a plane perpendicular to the direction of polarization of the incident plane-polarized wave. Accordingly, it will be apparent here that the plane-polarized wave experiences both phase-retardation and angular rotation of substantially 90° as it transmits through the retardation plate 18. Of course, this 90° angular rotation of the direction of polarization of the incident plane-polraized wave is caused by three conditions; (1) the optic axis of the retardation plate 18 is parallel to the Z axis, (2) the retardation plate 18 is a half-wave birefringent material, and (3) the direction of polarization of the incident plane-polarized wave is displaced 45° from the Z axis, or to say it otherwise, it is displaced 45° from both the fast and slow axes of the retardation plate 18.

The retardation plate 18 is shown in FIGURE 4 in partial cut-away so that the phase-retardation of the plane-polarized wave may be graphically represented. Note that the E and O waves 17 and 19 of the incident plane-polarized wave, respectively enter the plate 18 in substantially the same phase but that they emerge from the plate 18 phase displaced approximately one-half wave or 90°. The plane-polarized light emerging from the retardation plates 18 and traveling in the direction of the X axis is graphically represented by the conventional E–O wave schematic 20, which shows the phase relationship of the E wave 17″ with respect to the O wave 19″. In addition, the E vector 23 of the emerging plane-polarized wave is conventionally represented in angular relationship with the component forces in the imaginary Y–Z plane 22. Note that E vector 23 is 45° displaced from both the fast and slow axes of the retardation plate 18, but is now 90° displaced from or perpendicular to the E vector 15 of the incident plane-polarized light.

It will be apparent here that when plane-polarized light impinges upon a half-wave birefringent material with its direction of polarization at a 45° angle to the optic axis of the birefringent material, such plane-polarized light experiences both phase-retardation and angular rotation of approximately one-half wave or 90°.

*Detailed description.—FIGURES 5–8*

Figure 5:
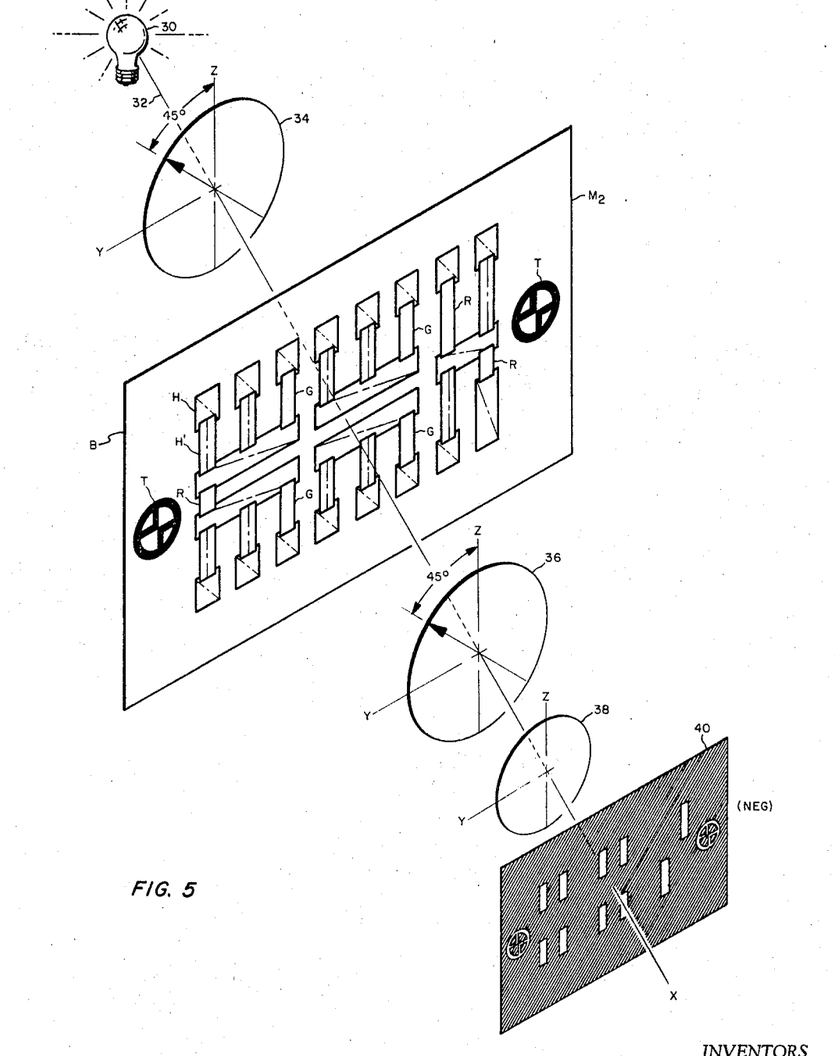
FIGURES 5 and 6 show schematically the manner in which negatives bearing different groups of components of the selected configuration of FIGURE 2 are photographically prepared from a single master drawing according to the present invention.
Figure 6:
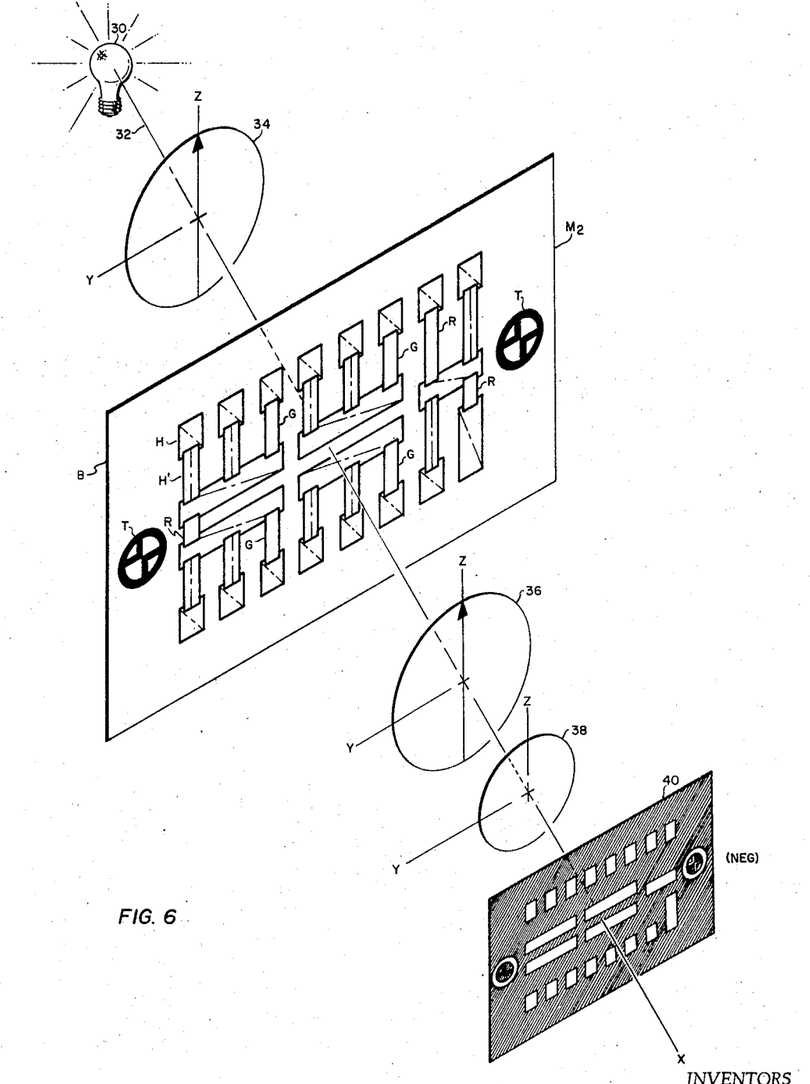

FIGURES 5 and 6 schematically depict a preferred method by which at least two transparencies, such as photographic negatives, may be prepared from the single master drawing $M_2$ in accordance with the present invention. More specifically, FIGURES 5 and 6 each include a light source 30, which may be any incandescent bulb, a plane-polarizer 34, the master board $M_2$ of FIGURE 2, a plane-analyzer 36, a reduction lens 38, and a photographic negative 40. For purposes of this description, only the light waves emanating from source 30 toward negative 40 will be considered. It will be assumed, also, that no significant light waves from source 30, or from any other source, will impinge upon master drawing $M_2$ without first transmitting through the plane-polarizer 34, and that no significant light waves emitting from master drawing $M_2$ will impinge upon the negative 40 without first transmitting through the plane-analyzer 36 and reduction lens 38 in that order.

Referring specifically to FIGURE 5, all light waves emanating from source 30, which impinge upon the plane-polarizer 34, are plane-polarized in the direction of the polarization axis of plane-polarizer 34, as represented by the arrow in the plane of the plane-polarizer 34. The plane-polarized light emanating from the plane-polarizer 34, impinges upon and transmits through the base material B of master drawing $M_2$. However, at areas where the plane-polarized light impinges upon the half-wave birefringent tapes H', such light waves are phase-retarded and angularly rotated substantaiily 90° in accordance with the principles described above with regard to FIGURE 4. That is to say, the polarization axis of the polarized light emanating from the half-wave birefringent tapes H' will be angularly rotated 90° from the position of the polarization axis of the plane-polarizer 34 since the polarization axis of the plane-polarizer 34 is at a 45° angle to the Z axis, or to say it otherwise such polarization axis is at a 45° angle to the optic axes (note the "dash-dot-dash" axes of tapes H') of the half-wave birefringent tapes H'. Of course, since the polarization axis of the plane-polarizer 34 is parallel to the optic axes (note the "dash-dot-dash" axes of tapes H) of the half-wave birefringent tapes H, the polarization axis of the polarized light emerging from half-wave birefringent tapes H will be the same as the polarization axis of the polarized light impinging upon the master drawing $M_2$, i.e., no phase-retardation or angular rotation occurs. In addition, substantially no light will emerge from the registration marks T since such marks are black. Also, the light emanating from the tapes R and G will be substantially plane-polarized red and green light, respectively. In this connection, the tapes R and G are non-birefringent and of the type which will transmit a sufficient intensity of light so that such colored ligh will expose the negative 40.

The plane-analyzer 36 is positioned so that its polarization axis (note the arrow in the plane of the plane-analyzer 36) is at a 45° angle to the Z axis, thus placing the polarization axis parallel to the optic axes of the half-wave birefringent tapes H, and at a 45° angle to the optic axes of the half-wave birefringent tapes H'. It should be noted here that in the special case of FIGURE 5, the emergent polarization axis of the light emanating from birefringent tapes H is parallel to the polarization axis of the plane-analyzer 36 whereas the emergent polarization axis of the light emanating from the birefringent tapes H' is perpendicular to the polarization axis of the plane-analyzer 36. This of course is due to the phase-retardation and angular rotation feature of the birefringent tapes H'.

As is well-known in the photographic art, a plane-analyzer will substantially block all light plane-polarized in a direction perpendicular to the polarization axis of the plane-analyzer, whereas it will substantially pass all light polarized in a direction parallel to its polarization axis. Of course, all light polarized at an angle other than parallel or perpendicular to the polarization axis of the plane-analyzer 36, will be partially passed and partially blocked depending upon the amount of angular displacement of the polarization axis of such light. Thus, the plane-polarized light emanating from the birefringent tapes H, as well as the plane-polarized light emanating from the solid colored tapes R and G and from the master drawing M₂ at areas where no tapes or registration marks exist, will be passed by the plane-analyzer 36, transmit through the reduction lens 38, and expose the negative 40, as shown by the cross-hatched portions of negative 40. However, the plane-polarized light emanating from the birefringent tapes H' will be substantially blocked by the plane-polarizer 36 and hence will not impinge upon and expose the negative 40, as shown by the solid white portions of negative 40. Of course, since insufficient light transmits through the registration marks T, the negative 40 will not be exposed at areas corresponding thereto, as shown by the solid white registration marks on the negative 40.

It will be apparent here that proper polarization of the plane-polarized light impinging upon master board M₂ with respect to the optic axes of tapes H and H', and proper orientation of the polarization axis of the plane-analyzer 36 with respect to the emergent polarization axis of the plane-polarized light emanating from the specially oriented birefringent tapes H', provides a unique method of optically distinguishing the birefringent tapes H' from the birefringent tapes H and the colored tapes R and G. Thus, at this point it can be seen that a photographic negative delineating the birefringent tapes H' from all other tapes mounted on master drawing M₂ can be produced by orienting the polarization axis of both the plane-polarizer and the plane-analyzer at a 45° angle with respect to the optic axes of the birefringent tapes H'. A method for optically distinguishing the specially oriented birefringent tapes H is depicted in FIGURE 6, as shown specifically by the negative 40. Note that like elements in FIGURES 5 and 6 are indicated with like reference numerals.

Referring specifically now to FIGURE 6, the polarization axis of the plane-polarizer 34 is now positioned parallel to the Z axis, and thus parallel to the optic axis of the birefrigent tapes H'. However, the axis of the plane-polarizer 34 is now at a 45° angle to the optic axes of the birefringent tapes H. Again, the plane-polarized light impinging upon the master drawing M₂ transmits through the base material B of the master drawing M₂. However, at areas where the plane-polarized light impinges upon the birefringent tapes H, such light is phase-retarded and angularly rotated again in accordance with the principles described above regarding FIGURE 4. Of course, since the polarization axis of the plane-polarizer 34 is now parallel to the optic axes of the birefringent tapes H', the polarization axis of the light emerging from birefringent tapes H' will be the same as the polarization axis of the plane-polarized light impinging upon the master drawing M₂. Also, substantially no light emerges from the registration marks T since such marks are black, while a sufficient intensity of plane-polarized red and green light emanates respectively from the tapes R and G with an emergent polarization axis parallel to the Z axis so that such colored light will expose the negative 40.

The plane analyzer 36 is now positioned so that its polarization axis is parallel to the Z axis, parallel to the optic axes of birefringent tapes H', and at a 45° angle to the optic axes of birefringent tapes H. Thus, in the special case of FIGURE 6, the emergent polarization axis of the light emanating from birefringent tapes H' is parallel to the polarization axis of the plane-analyzer 36, whereas the emergent polarization axis of the light emanating from the birefringent tapes H is perpendicular to the polarization axis of the plane-analyzer 36, again due to the phase-retardation and angular rotation feature of the birefringent tapes H. Accordingly, the plane-polarized light emanating from the birefringent tapes H', as well as the plane-polarized light emanating from the solid colored tapes R and G and from the master drawing M₂ at areas where no tapes or registration marks exist, will be passed by the plane analyzer 36, transmit through the reduction lens 38, and expose the negative 40, as shown by the cross-hatched portions of negative 40. In the example of FIGURE 6, however, the plane-polarized light emanating from the birefringent tapes H will be blocked by the plane-polarizer 36 and hence will not impinge upon and expose the negative 40, as shown by the solid white portion of negative 40. The registration marks T will also not expose negative 40 since insufficient light is transmitted therethrough.

As stated above with regard to FIGURE 5, the proper polarization of the plane-polarized light impinging upon master drawing M₂ with respect to the optic axes of tapes H and H', and proper orientation of the polarization axis of the plane-analyzer 36 with respect to the emergent polarization axis of the plane-polarized light emanating from the specially oriented birefringent tapes H and H' provides a unique method of optically distinguishing the birefringent tapes H from the birefringent tapes H' and the colored tapes R and G. Thus, FIGURE 6 depicts the procedure for preparing a photographic negative delineating the birefringent tapes H from all other tapes mounted on the master drawing M₂.

It will be apparent here that FIGURES 5 and 6 depict a novel arrangement for developing two photographic negatives from a single master drawing. In this respect, by utilizing the principles taught in the above mentioned patent, two additional photographic negatives can be developed which independently delineate other aspects of the selected configuration, such as depicted by the solid colored tapes R and G. This is achieved by substituting first a red filter for the plane-analyzer 36 when the tapes R are to be optically distinguished, and then a green filter when the tapes G are to be optically distinguished. Thus four photographic negatives can be produced from the master board M₂, each negative respectively delineating tapes H, H', R and G. Note here that the reduction lens 38 may be any value depending, of course, upon the desired proportion between master board M₂ and the photographic negative 40.

Figure 7:
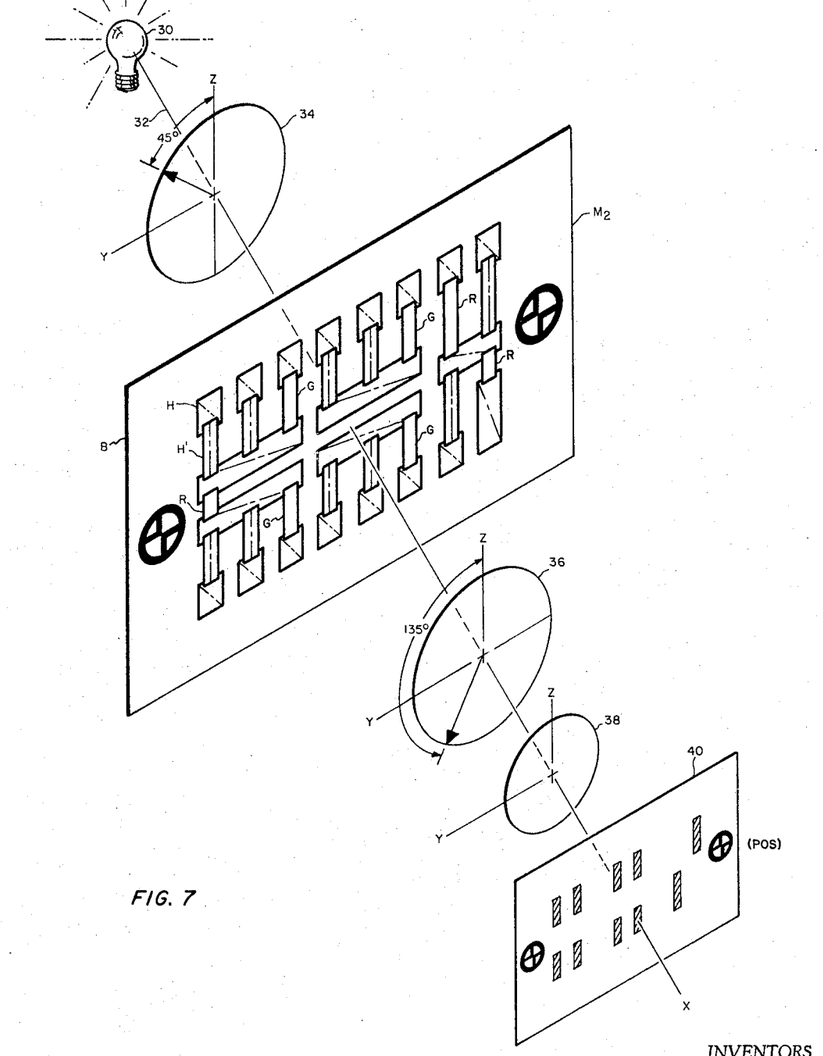
FIGURE 7 shows schematically the manner in which positives bearing different groups of components of the selected configuration of FIGURE 2 are photographically prepared from a single drawing according to the present invention.

Referring now to FIGURE 7, there is shown a method by which a transparency known in the art as a "positive" may be prepared from the master drawing M₂. In this respect, again like elements are referenced with like numerals. In the procedure of FIGURE 7, the plane-polarizer 34 is oriented so that its polarization axis is at a 45° angle to the Z axis and thus parallel to the optic axes of birefringent tapes H and 45° displaced from the optic axes of birefringent tapes H'. Again, the plane-polarized light impinging upon the master drawing $M_2$ transmits through the base material B, but at areas where the plane-polarized light impings upon tapes H' such light waves are phase retarded and angularly rotated again in accordance with the principles described above regarding FIGURE 4. Of course, since the polarization axis of the plane-polarizer 34 is parallel to the optic axes of the birefringent tapes H, the polarization axis of the light emerging from tapes H will be the same as the polarization axis of the plane-polarizing light impinging upon the master drawing $M_2$. Again, substantially no light emerges from the registration marks T while a reasonable intensity of substantially plane-polarized red and green light emanates respectively from the tapes R and G with an emergent polarization axis 45° displaced from the Z axis, so that such colored light will expose the positive 40.

In this case, the plane-analyzer 36 is positioned so that its polarization axis is displaced 135° from the Z axis, thus placing the polarization axis perpendicular to both the optic axes of briefringent tapes H and to the polarization axis of plane-polarizer 34. Thus, in the special case of FIGURE 7, the emergent polarization axis of the light emanating from birefringent tapes H' is parallel to the polarization axis of the plane-analyzer 36, whereas the emergent polarization axis of the light amanating from the birefringent tapes H is perpendicular to the polarization axis of the plane-analyzer 36 but this time due to the fact that no phase-retardation and angular rotation occurs regarding the plane-polarized light which transmits through birefringent tapes H. Accordingly, the plane-polarized light emanating from the birefringent tapes H, as well as the plane-polarized light emanating from the solid colored tapes R and G and from the master drawing $M_2$ at areas where no tapes or registration marks exist, will be blocked by the plane-analyzer 36 and hence will not impinge upon and expose the positive 40, as shown by the solid white portion of positive 40. On the other hand, however, the plane-polarized light emanating from the birefringent tapes H' will be passed by the plane-analyzer 36, transmit through the reduction lens 38, and expose the positive 40, as shown by the cross-hatched portions of transparency 40. In the example of FIGURE 7, the registration marks are fabricated by overlapping two half-wave birefringent tapes, with one of the tapes having its optic axes parallel to the optic axes of tapes H, and the other of the tapes having its optic axis parallel to the optic axes of tapes H'. Thus, whether the polarization axis of the light incident upon the master drawing $M_2$ is parallel to the optic axes of tapes H or parallel to the optic axes of tapes H', the plane-polarized light tarnsmitted through the reigstration marks T will always be properly phase-retarded and angularly rotated so that it will pass through the plane-analyzer 36, transmit through lens 38 and expose the positive 40, whether the plane-analyzer is 45° displaced or parallel to the Z axis.

It will be apparent here that FIGURE 7 depicts an arrangement for developing a photographic positive from the master drawing $M_2$ in accordance with the present invention. Again, proper polarization of the plane-polarized light impinging upon master drawing $M_2$ with respect to the optic axes of tapes H and H', and proper orientation of the polarization axis of the plane-analyzer 36 with respect to the emergent polarization axis of the plane-polarized light emanating from the specially oriented birefringent tapes H and H' provides a unique method of optically distinguishing the tapes H' from the tapes H, R and G. Of course, proper orientation of the polarization axis of both the plane-polarizer 34 and the plane-analyzer 36 would permit the developer of a positive having tapes H and registration marks T exposed, and tapes H', R and G not exposed.

Figure 8:
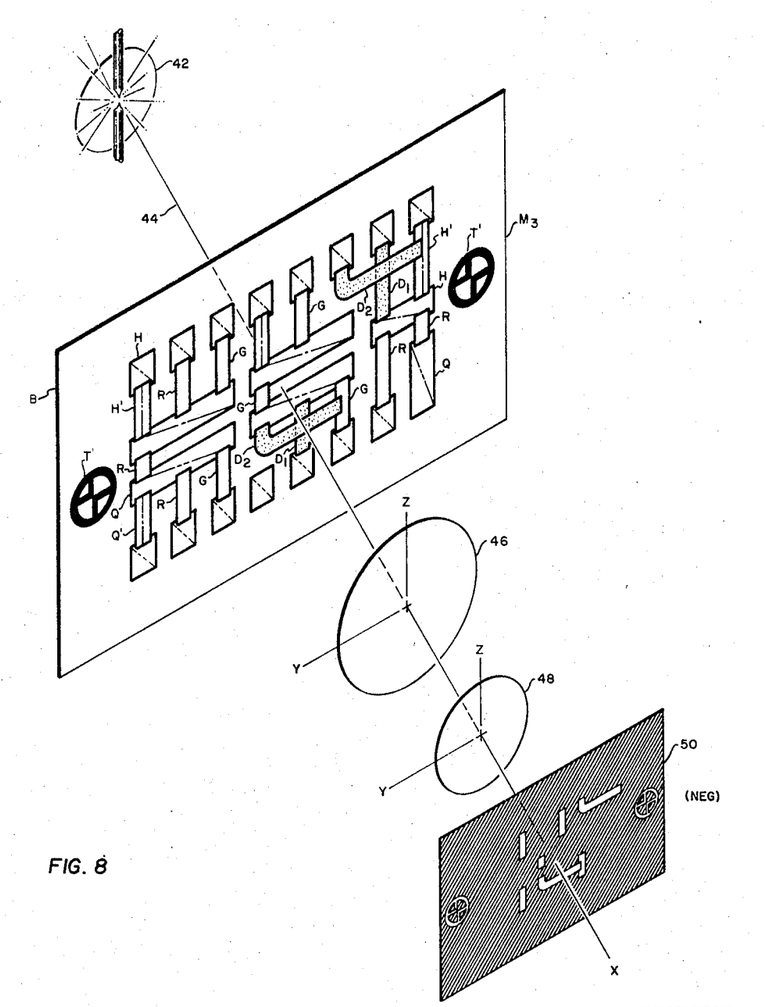
FIGURE 8 shows schematically the manner in which negatives bearing different groups of components of the selected configuration of FIGURE 3 are photographically prepared from a single master drawing according to both the birefringent separation techniques of the present invention and to the color separation techniques disclosed in the above-mentioned patent.

FIGURE 8 graphically shows the master board $M_3$ of FIGURE 3 in an arrangement whereby the color separation technique of the above-mentioned patent may be utilized in combination with half-wave and quarter-wave birefringent tapes utilized in accordance with the present invention.

Basically, the colored tapes R or G, including the red and green color dotted tapes $D^1$ and $D^2$, are photographically distinguished by utilizing a light source, such as arc light 42, and a color filter, such as green filter 46. In this respect, note that plane-polarized light is not needed and hence neither a plane-polarizer nor a plane-analyzer are needed to practice the color separation technique. Of course, a red filter would then be substituted for the green filter 36 so that the red colored tapes R and the red color dotted tapes $D_1$ may be photographically distinguished. The reduction lens 48 functions in the same manner as the reduction lens 38 of FIGURES 5–7.

It should be noted here that the specially oriented quarter-wave birefringent tapes Q and Q' may be photographically distinguished from each other as well as from the half-wave tapes H and H', the red and green colored tapes R and G, and the red and green color dotted tapes $D_1$ and $D_2$, by utilizing a circular-analyzer in lieu of the plane-analyzer 36 as described above regarding FIGURES 5–7. In this respect, the plane-polarizer 34 would be oriented so that its polarization axis is at a 45° angle to the Z axis, as shown in FIGURE 5. The plane-polarized light incident upon tapes H, H', R and G transmit through the master drawing $M_3$ in the same manner as above described respecting FIGURE 5. However, since the polarization axis of the plane-polarizer 34 is to the right or clockwise of the optic axes of the quarter-wave tapes Q', the light emerging from tapes Q' will be right circular polarized, whereas since the polarization axis is parallel to the quarter-wave tapes Q, the light emerging from tapes Q will be plane-polarized. Therefore, by placing a left-circular analyzer in place of the plane-analyzer 36 (note FIGURE 5), the right circular polarized light emanating from quarter-wave tapes Q' will be blocked, hence prevented from exposing the negative 50. However, the plane-polarized light emanating from tapes H, H', R, G and Q will transmit through the left-circular analyzer and the reduction lens 48 with sufficient intensity to expose the negative 50, thus providing photographic distinction between the quarter-wave tapes Q' and the rest of the master drawing $M_3$. Photographic distinction of the quarter-wave tapes Q may then be achieved by positioning the polarization axis of the plane-polarizer 34 parallel to the Z axis, and by utilizing a right-circular analyzer in lieu of the plane-analyzer 36, thus blocking the left-circular polarized light emanating from quarter-wave tapes Q and passing the plane-polarized light emanating from the master drawing $M_3$. Again the registration marks T will be photographically distinguished since substantially no light emanates therefrom.

In addition to the exemplary embodiments depicted in FIGURES 1–8, it is also contemplated that other orientations of the optic axes of various groups of birefringent tapes may be used without departing from the spirit and scope of the present invention. By way of example, up to eight independent groups of quarter-wave tapes may be oriented so that the optic axes of any one group of tapes are displaced at least 22.5° from the optic axes of any other group of tapes. Thus, when eight distinct groups of quarter-wave tapes are specially oriented, there will be one group having its axes oriented for each 22.5° from 0° to 180°, including one group oriented at either 0° or 180°. In this respect, when the axis of the plane-polarizer is positioned 45° to the left or right of one group of tapes, the light waves emerging from such group of tapes will be circularly polarized, left circular when positioned to the left and right circular when positioned to the right. It will be apparent, therefore, that when eight distinct groups of quarter-wave tapes are positioned on a master drawing, and when the axis of the plane-polarizer is successively positioned in four 22.5° steps commencing with 67.5° and ending with 135°, for example, the axis of the plane-polarizer will always be positioned 45° to the left of the optic axes of one group of quarter-wave tapes and 45° to the right of the optic axis of another group of quarter-wave tapes. Also, in each successive position of the axis of the plane-polarizer, it will always be to the right of the optic axes of one or more groups of tapes and to the left of the remaining groups of tapes. Thus, at each successive position of the plane-polarizer, both right circular and left circular polarized light will emanate from the master board from only two groups of tapes, while either plane-polarized or elliptically polarized light will emanate from the remaining groups of tapes. In this connection, a right circular analyzer can be used to photographically distinguish the group of tapes emanating left circular polarized light, whereas a left circular analyzer can be used to photographically distinguish the group of tapes emanating right circular polarized light. It should be noted here that the right and left circular analyzer will transmit a sufficient intensity of plane-polarized and elliptically polarized light so as to expose the negative a sufficient degree to provide the necessary and desired contrast. In this latter embodiment of the present invention, both red and green color tapes as well as red and green color dotted tapes can be used to provide means for developing two additional negatives. Of course, the color separation technique disclosed in the above mentioned patent would be combined with the birefringent separation technique of the present invention. In addition, it is possible to utilize more than two colors in the color separation feature so as to provide additional negatives. The specific technique is commonly referred to as "split-filtration" and is adequately disclosed in the above mentioned co-pending patent application ser. No. 217,450.

It will be apparent from the foregoing detailed description of FIGURES 1-8, that the present invention uniquely provides a novel arrangement for preparing a master drawing having various components of a desired configuration which are displayed by respective pre-established patterns of birefringent tapes of various optical-path thicknesses so that, by optical procedures, the master drawing may be utilized to prepare a plurality of photographic negatives which can be subsequently used for fabricating microminiature substrates, thus advantageously circumventing the usual ordeal of preparing a plurality of master drawings, one for each component of the desired configuration.

The terms and expression which have been employed herein are used as terms of description and not of limitation and it is not intended, in the use of such terms and expressions, to exclude any equivalents of the features shown and described, or portions thereof, but it is recognized that various modifications are possible within the scope of the present invention.

Without further elaboration, the foregoing is considered to explain the character of the present invention so that others may, by applying current knowledge, readily adapt the same for use under varying conditions of service while still retaining certain features which may properly be said to constitute the essential items of novelty involved, which items are intended to be defined and secured by the appended claims.

We claim:
1. A multilayer master drawing for photographically preparing a plurality of transparencies for subsequent use in the development of stencils for the subsequent fabrication of thin film substrates, the combination comprising:
 (a) a base material;
 (b) a plurality of birefringent tapes disposed on said base material for representing a desired configuration;
 (c) each of said tapes includes an optic axis with one group of said tapes having their optic axes oriented in one direction for delineating one common aspect of said configuration, and other groups of said tapes having their optic axes oriented in other directions for respectively delineating other common aspects of said configuration; and
 (d) said groups of tapes having their optic axes relatively oriented upon said base material so that light polarized in one direction will be phase retarded by said one group of tapes while light polarized in other directions will be respectively phase retarded by said other groups of tapes, whereupon circularly polarized light may be utilized for successively photographing each distinguishable common aspect from each others of said common aspects.

2. A multilayer master drawing in accordance with claim 1 wherein:
 (a) said tapes are half-wave birefringent tapes.

3. A multilayer master drawing in accordance with claim 1 wherein:
 (a) said tapes are quater-wave birefringent tapes.

4. A multilayer master drawing in accordance with claim 1 wherein:
 (a) some of said tapes defining common aspects are half-wave birefringent tapes, and the remaining of said tapes are quarter-wave birefringent tapes.

5. A multilayer master drawing in accordance with claim 1 and further including:
 (a) a group of solid colored non-birefringent tapes of a first color for delineating other common aspects of said configuration; and
 (b) other groups of solid colored non-birefringent tapes of other colors for respectively delineating other common aspects of said configuration, whereupon when photographing successive aspects, said aspects respectively represented by said colors can be sequentially distinguished.

6. A multilayer master drawing in accordance with claim 5 and further including:
 (a) a group of non-birefringent tapes having a substantially regular geometric pattern of said one color formed thereon for delineating other common aspects of said configuration; and
 (b) other groups of non-birefringent tapes each respectively having a substantially regular geometric pattern of said other colors formed thereon for respectively delineating other common aspects of said configuration, and
 (c) said geometrically color patterned tapes being relatively mounted on said base material so that their respective color patterns can be photographically observed at locations of overlap, whereupon when photographing successive aspects, said aspects respectively represented by said colors can be sequentially distinguished with no substantial color loss of the configuration at said locations of overlap.

References Cited

UNITED STATES PATENTS

| | | |
|---|---|---|
| 2,393,968 | 2/1946 | Burchell et al. _______ 350—158 |
| 3,065,681 | 11/1962 | Bornemann et al. _______ 95—1 |
| 3,288,607 | 11/1966 | Middleton _______ 96—36.2 X |
| 3,295,916 | 1/1967 | Eaves. |

DAVID SCHONBERG, *Primary Examiner.*

PAUL R. MILLER, *Assistant Examiner.*

U.S. Cl. X.R.

96—32.5; 350—148, 153, 158, 159